(12) United States Patent
Gyorfi et al.

(10) Patent No.: US 7,657,614 B2
(45) Date of Patent: Feb. 2, 2010

(54) MULTIPLE PARTICIPANT, TIME-SHIFTED DIALOGUE MANAGEMENT

(75) Inventors: Julius S. Gyorfi, Vernon Hills, IL (US); Eric R. Buhrke, Clarendon Hills, IL (US); Juan M. Lopez, Chicago, IL (US); Swee M. Mok, Palatine, IL (US)

(73) Assignee: Motorola, Inc., Schaumburg, IL (US)

( * ) Notice: Subject to any disclaimer, the term of this patent is extended or adjusted under 35 U.S.C. 154(b) by 214 days.

(21) Appl. No.: 11/959,726

(22) Filed: Dec. 19, 2007

(65) Prior Publication Data
US 2009/0165000 A1 Jun. 25, 2009

(51) Int. Cl.
G06F 15/16 (2006.01)
G06F 13/16 (2006.01)

(52) U.S. Cl. ............... 709/220; 709/224; 709/228; 711/114; 707/10

(58) Field of Classification Search ........... 709/220, 709/224, 226, 29; 707/10, 8; 711/114
See application file for complete search history.

(56) References Cited

U.S. PATENT DOCUMENTS

| | | | |
|---|---|---|---|
| 6,119,147 A | 9/2000 | Toomey et al. | |
| 6,233,389 B1 | 5/2001 | Barton et al. | |
| 6,847,778 B1 | 1/2005 | Vallone et al. | |
| 6,907,305 B2 * | 6/2005 | Mata et al. | 700/99 |
| 6,928,248 B2 * | 8/2005 | Achour et al. | 398/115 |
| 7,406,473 B1 * | 7/2008 | Brassow et al. | 707/10 |
| 2002/0002611 A1 * | 1/2002 | Vange | 709/223 |
| 2002/0029167 A1 * | 3/2002 | Muller | 705/14 |
| 2004/0051745 A1 | 3/2004 | Gargi | |
| 2005/0132418 A1 | 6/2005 | Barton et al. | |
| 2008/0137558 A1 * | 6/2008 | Baird | 370/260 |
| 2009/0103689 A1 * | 4/2009 | Katis et al. | 379/88.13 |

* cited by examiner

Primary Examiner—Khanh Q Dinh

(57) ABSTRACT

A virtual environment server. The server manages time-shifted presentation data between multiple participants in a shared virtual environment system. The server includes a routing module configurable for coupling to multiple participants, a real-time data management module coupled to the routing module, a time-shifted data management module coupled to the routing module, and a data store module coupled to the real-time data management module and to the time-shifted data management module. Participant output presentation data is received from the participants, stored as real-time presentation data, and transferred to appropriate participants. In response to requests from a requesting participant to obtain time-shifted presentation data from a time-shifted participant and any influence participants, time-shifted presentation data is retrieved from the data store module and transferred to the requesting participant. Influence participants are participants whose input presentation data are influenced by time-shifted participant and whose output presentation data influence presentation environment of requesting participant.

18 Claims, 5 Drawing Sheets

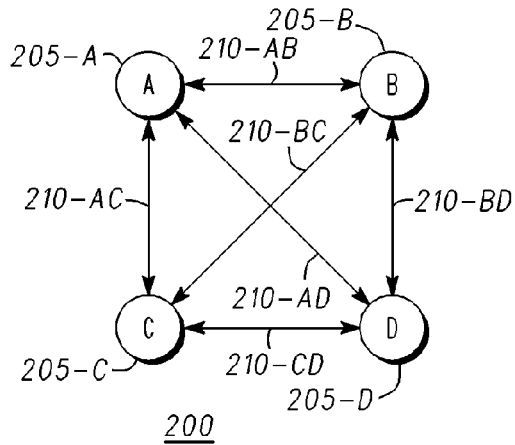
FIG. 2A
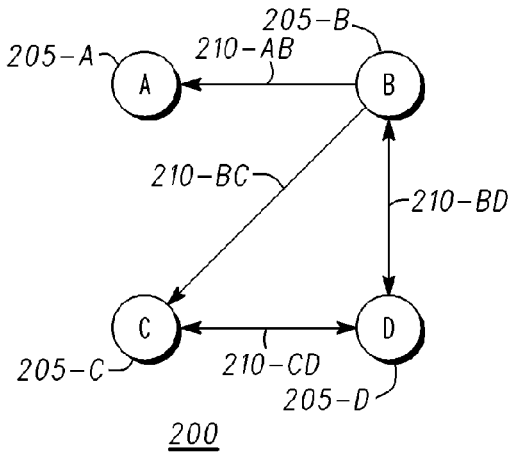
FIG. 2B
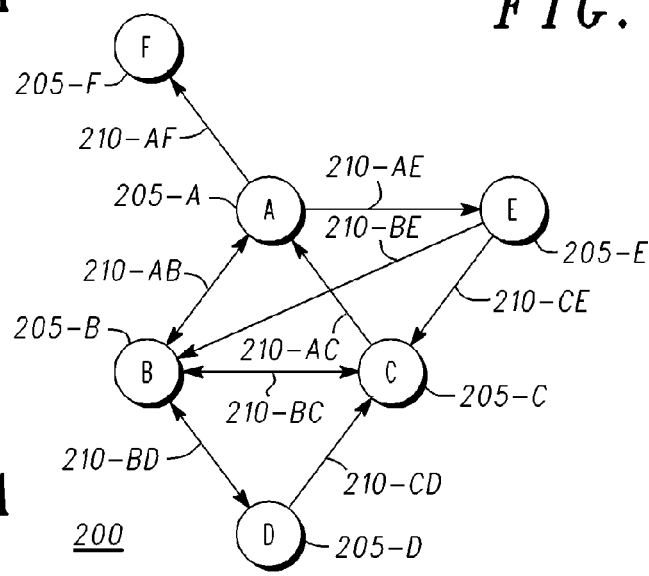
FIG. 3A
FIG. 3B

MULTIPLE PARTICIPANT, TIME-SHIFTED DIALOGUE MANAGEMENT

BACKGROUND

Remote collaboration in real-time between individuals and groups has evolved from simple individual/conference telephone calls and more complex videoconferencing to the more realistic environment of telepresence. The content of a telephone call is limited to audio content while the content of a videoconference can combine both audio and video, thereby providing the capability to provide more information more clearly and more rapidly. For a more realistic impression, however, neither can approach that of the more recent developments in telepresence.

These developments in telepresence provide the ability for multiple participants to share a virtual environment and to interact with each other in real-time via an avatar associated with each individual. An avatar is a representation of one of the participants in the shared environment. Each participant can have a view into this virtual shared environment from their communication device which could be a personal computer, a handset, a telephone, a personal digital assistant (PDA), or the like. Each participant sees on his/her screen essentially a virtual room within which there are other participants who are each represented by their own avatar. An avatar could be a three-dimensional partial body or full body representation of the participant, or it could be something as simple as a small video screen (a video avatar) with the image of the participant on it inserted into the scene. If a participant is represented by a video avatar, the participant can communicate with other participants via visual and audio transmissions from the participant. On the other hand, a full body avatar can point to objects created in the virtual environment and move around within it, thus, providing a more realistic experience for the participants which can be further enhanced by implementing the full body avatar as a three-dimensional avatar.

Thus, it is now possible to hold meetings that include remotely located participants that provide the participants the impression, at least to some degree, of being in the same room and even sitting at the same table. Such meetings could include, for example, those between a project development team involving engineers and managers located in several different countries. Or, it could include a team of fire, police, and other personnel assembled to respond to a large chemical fire, a terrorist attack, or other emergency.

BRIEF DESCRIPTION OF THE DRAWINGS

The accompanying drawings provide visual representations which will be used to more fully describe various representative embodiments and can be used by those skilled in the art to better understand the representative embodiments disclosed and their inherent advantages. In these drawings, like reference numerals identify corresponding elements.

FIG. 2A is a drawing of a coupling diagram for multiple participants as described in various representative embodiments.

FIG. 2B is a drawing of another coupling diagram for multiple participants as described in various representative embodiments.

FIG. 3A is a drawing of still another coupling diagram for multiple participants as described in various representative embodiments.

FIG. 3B is a drawing of an adjacency matrix for the coupling diagram of FIG. 3A.

DETAILED DESCRIPTION

Figure 1:
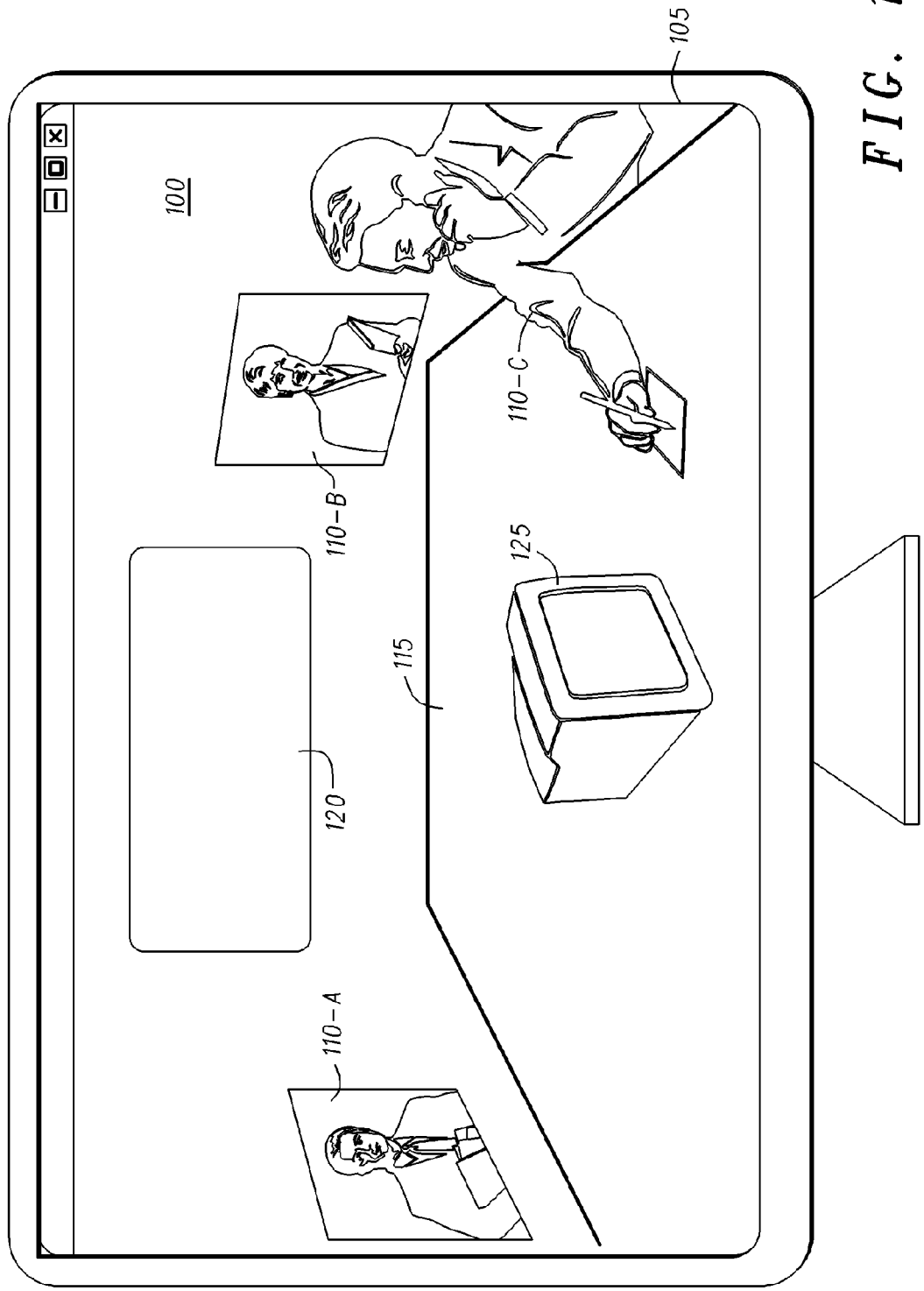
FIG. 1 is a drawing of a shared virtual environment depicted on a video display as described in various representative embodiments.

As shown in the drawings for purposes of illustration, novel techniques are disclosed herein for the management of time-shifted input streams from participants in a shared, multiple participant, virtual environment. Participants are able to observe and interact with other participants in the environment in real-time. Also, however, the participants can selectively pause, rewind, stop, replay, and fast-forward input from one or more of the other participants while maintaining active coupling with other participants who are not influenced by the time-shifted participants. Previously, participants in the shared virtual environment have only been able to interact with other participants in the shared virtual environment in real-time.

Using techniques disclosed herein, a participant can review previous input from another participant. If, for example, a participant is late joining a meeting held in the shared virtual environment, that participant can catch-up with the presentations made in the meeting by doing a selective, quick review of earlier input from one or more of the other participants. Any input stream available to the participant can be reviewed at any time the participant deems important while that participant maintains real-time active interactions with the other non-time-shifted participants that are not influenced by the time-shifted participant.

In the following detailed description and in the several figures of the drawings, like elements are identified with like reference numerals.

FIG. 1 is a drawing of a shared virtual environment 100 depicted on a video display 105 as described in various representative embodiments. The video display 105 is more generally referred to herein as presentation environment 105 to specifically include various forms and combinations of shared environments, such as audio only, video only, audio-video, and the like. In FIG. 1, the shared virtual environment 100 presents a participant, who is not shown in the figure, with a virtual view of a meeting involving a first, a second, and a third participant. The shared virtual environment 100 includes a first participant avatar 110a, a second participant avatar 110b, and a third participant avatar 110c which represent respectively the first, second, and third participants. The first, second, and third participant avatars 110a, 110b, 110c, as well as any other avatars in other embodiments, are collectively referred to as participant avatars 110. Also present in the video display 105 of FIG. 1 is a table 115 around which the participant avatars 110 are located as if the participants themselves were seated. In addition, the video display 105 includes a virtual screen 120 and a virtual object 125. The virtual screen 120 could be used, for example, to show a picture or video stream deemed to be of value to the meeting participants. The information displayed on the virtual screen 120 could be, for example, a map to an incident such as a fire or other site, a live video of such an incident, a weather map, a spreadsheet, or other appropriate data stream. The virtual object 125 could be the representation of a real object that could have been added to the shared virtual environment 100, could be moved from place to place within the shared virtual environment 100, or could be removed from it.

FIG. 2A is a drawing of a coupling diagram 200 for multiple participants 205-A,205-B,205-C,205-D as described in various representative embodiments. In FIG. 2A, the coupling diagram 200 describes coupling between multiple participants 205-A,205-B,205-C,205-D that are interacting in a fully-connected, symmetric shared virtual environment 100. First participant 205-A, which may also be referred to herein as participant A 205-A, second participant 205-B, which may also be referred to herein as participant B 205-B, third participant 205-C, which may also be referred to herein as participant C 205-C, and fourth participant 205-D, which may also be referred to herein as participant D 205-D, are fully and symmetrically coupled to each of the other participants, i.e., each participant 205-A,205-B,205-C,205-D can both transmit information to and receive information from each of the other participants. Participant A 205-A, participant B 205-B, participant C 205-C, participant D 205-D, and other participants in other embodiments may be referred to collectively herein as participants 205. The symmetric coupling of the participants 205 is shown in FIG. 2A by the double headed arrows which represent (1) a coupling path AB 210-AB between participant A 205-A and participant B 205-B, (2) a coupling path AC 210-AC between participant A 205-A and participant C 205-C, (3) a coupling path AD 210-AD between participant A 205-A and participant D 205-D, (4) a coupling path BC 210-BC between participant B 205-B and participant C 205-C, (5) a coupling path BD 210-BD between participant B 205-B and participant D 205-D, and (6) a coupling path CD 210-CD between participant C 205-C and participant D 205-D. Coupling path AB 210-AB, coupling path AC 210-AC, coupling path AD 210-AD, coupling path BC 210-BC, coupling path BD 210-BD, coupling path CD 210-CD, and other coupling paths in other embodiments may be referred to collectively herein as coupling paths 210.

FIG. 2B is a drawing of another coupling diagram 200 for multiple participants 205-A,205-B,205-C,205-D as described in various representative embodiments. In FIG. 2B, the coupling diagram 200 describes coupling between multiple participants 205-A,205-B,205-C,205-D that are interacting in a partially-connected, asymmetric shared virtual environment 100. Participant A 205-A, participant B 205-B, participant C 205-C, and participant D 205-D are partially and asymmetrically coupled to each other. In particular, note that participant A 205-A and participant C 205-C are asymmetrically coupled to participant B 205-B via respectively coupling path AB 210-AB and coupling path BC 210-BC in that they can both receive information from participant B 205-B but neither can transmit information to participant B 205-B; participant B 205-B and participant D 205-D are symmetrically coupled to each other via coupling path BD 210-BD in that they can both receive information from and transmit information to each other; and participant C 205-C and participant D 205-D are symmetrically coupled to each other via coupling path CD 210-CD in that they can both receive information from and transmit information to each other. Further note that there are no direct communication paths between participant A 205-A and participant C 205-C or between participant A 205-A and participant D 205-D.

FIG. 3A is a drawing of still another coupling diagram 200 for multiple participants 205-A,205-B,205-C,205-D,205-E, 205-F as described in various representative embodiments. In FIG. 3A, the coupling diagram 200 describes coupling between multiple participants 205-A,205-B,205-C,205-D, 205-E,205-F that are interacting in a partially-connected, asymmetric shared virtual environment 100.

Participant A 205-A is symmetrically coupled to participant B 205-B via coupling path AB 210-AB resulting in participant A 205-A being able to view inputs from participant B 205-B and in participant B 205-B being able to view inputs from participant A 205-A; participant A 205-A is asymmetrically coupled to participant C 205-C via coupling path AC 210-AC resulting in participant A 205-A being able to view inputs from participant C 205-C but in participant C 205-C being unable to view inputs from participant A 205-A; participant A 205-A is not directly coupled to participant D 205-D resulting in participant A 205-A being unable to view inputs from participant D 205-D and in participant D 205-D being unable to view inputs from participant A 205-A; participant A 205-A is asymmetrically coupled to participant E 205-E via coupling path AE 210-AE resulting in participant E 205-E being able to view inputs from participant A 205-A but in participant A 205-A being unable to view inputs from participant E 205-E; and participant A 205-A is asymmetrically coupled to participant F 205-F via coupling path AF 210-AF resulting in participant F 205-F being able to view inputs from participant A 205-A but in participant A 205-A being unable to view inputs from participant F 205-F.

As well, participant B 205-B is symmetrically coupled to participant C 205-C via coupling path BC 210-BC resulting in participant B 205-B being able to view inputs from participant C 205-C and in participant C 205-C being able to view inputs from participant B 205-B; participant B 205-B is symmetrically coupled to participant D 205-D via coupling path BD 210-BD resulting in participant B 205-B being able to view inputs from participant D 205-D and in participant D 205-D being able to view inputs from participant B 205-B; participant B 205-B is asymmetrically coupled to participant E 205-E via coupling path BE 210-BE resulting in participant B 205-B being able to view inputs from participant E 205-E but in participant E 205-E being unable to view inputs from participant B 205-B; and participant B 205-B is not directly coupled to participant F 205-F resulting in participant B 205-B being unable to view inputs from participant F 205-F and in participant F 205-F being unable to view inputs from participant B 205-B.

Also, participant C 205-C is asymmetrically coupled to participant D 205-D via coupling path CD 210-CD resulting in participant C 205-C being able to view inputs from participant D 205-D but in participant D 205-D being unable to view inputs from participant C 205-C; participant C 205-C is asymmetrically coupled to participant E 205-E via coupling path CE 210-CE resulting in participant C 205-C being able to view inputs from participant E 205-E but in participant E 205-E being unable to view inputs from participant C 205-C; and Participant C 205-C is not directly coupled to participant F 205-F resulting in participant C 205-C being unable to view inputs from participant F 205-F and in participant F 205-F being unable to view inputs from participant C 205-C.

In addition, participant D 205-D is not directly coupled to participant E 205-E resulting in participant D 205-D being unable to view inputs from participant E 205-E and in participant E 205-E being unable to view inputs from participant D 205-D; and participant D 205-D is not directly coupled to participant F 205-F resulting in participant D 205-D being unable to view inputs from participant F 205-F and in participant F 205-F being unable to view inputs from participant D 205-D.

Further, participant E 205-E is not directly coupled to participant F 205-F resulting in participant E 205-E being unable to view inputs from participant F 205-F and in participant F 205-F being unable to view inputs from participant E 205-E.

Note that the information broadcast by a first participant and received by a second and a third participant can influence the information that the second participant receives from the third participant. As an example, the information broadcast by participant A 205-A is received by participants B, E, and F 205-B,205-E,205-F. If participant E 205-E responds to the information received from participant A 205-A, that response will be viewed by participants B and C 205-B,205-C. Further, note that if participant C 205-C decides to respond to the response of participant E 205-E, that response will also be viewed by participant B 205-B. Thus, should participant B 205-B decide to pause, rewind, or fast-forward the input that it receives from participant A 205-A, a similar action will need to be taken with participants C and E 205-C,205-E otherwise confusion can result in what participant B 205-B views as input received from participants A, C, and E 205-A, 205-C,205-E. In other words, since the information received by participant B 205-B from participant A 205-A influences the information received by participant B 205-B from participants C and E 205-C,205-E, synchronization of inputs received by participant B 205-B from participants A, C, and E 205-A,205-C, 205-E must be maintained. Thus, by inspecting the various coupling paths 210 of the coupling diagram 200 for a given shared virtual environment 100, it can be determined whether or not information transmitted by any one of the participants and received by another participant can be influenced by the reception of that transmitted information by any of the other participants.

FIG. 3B is a drawing of an adjacency matrix 300 for the coupling diagram 200 of FIG. 3A. In FIG. 3B, the adjacency matrix 300 is created by listing each of the participants 205-A,205-B,205-C,205-D,205-E,205-F in the top row and in the left-most column. Then in a row identified as that of a particular participant, a "1" is placed in the column corresponding to each of the other participants if the particular participant of that row receives information from the participant of that column. This action will result in a column identified as that of a particular participant having a "1" placed in the row corresponding to each of the other participants if the particular participant of that column transmits information to the participant of that row. Thus, the entries in any row of the adjacency matrix 300 identify which participants the participant of that row can "see" or receive information from. Similarly, the entries in any column of the adjacency matrix 300 identify which participants the participant of that column can be "seen by" or transmit information to.

The adjacency matrix 300 for a given shared virtual environment 100 provides another means by which it can be determined whether or not information transmitted by any one of the participants and received by another participant can be influenced by the reception of that transmitted information by any of the other participants. As an example, inspecting the row associated with participant B 205-B it can be determined that participant B 205-B "sees" or receives information from participants A, C, D, and E 205-A,205-C,205-D,205-E which means that participant B 205-B can time-shift any of these participants. For the above example, wherein participant B 205-B time-shifts participant A 205-A, the column corresponding to the time-shifted participant A 205-A is then inspected. The inspection of the column corresponding to participant A 205-A reveals that participant A 205-A is "seen by" or transmits to participant E 205-E and participant F 205-F; inspection of the column associated with participant F 205-F reveals that participant F 205-F is not "seen by" any other participants; inspection of the column associated with participant E 205-E reveals that participant E 205-E is "seen by" participants B and C 205-B,205-C; and inspection of the column associated with participant C 205-C reveals that participant C 205-C is seen by participants A and B 205-A,205-B. Thus, information transmitted by participant A 205-A and received by participant B 205-B can be influenced by the reception of that transmitted information by participants C and E 205-C,205-E.

Figure 3C:
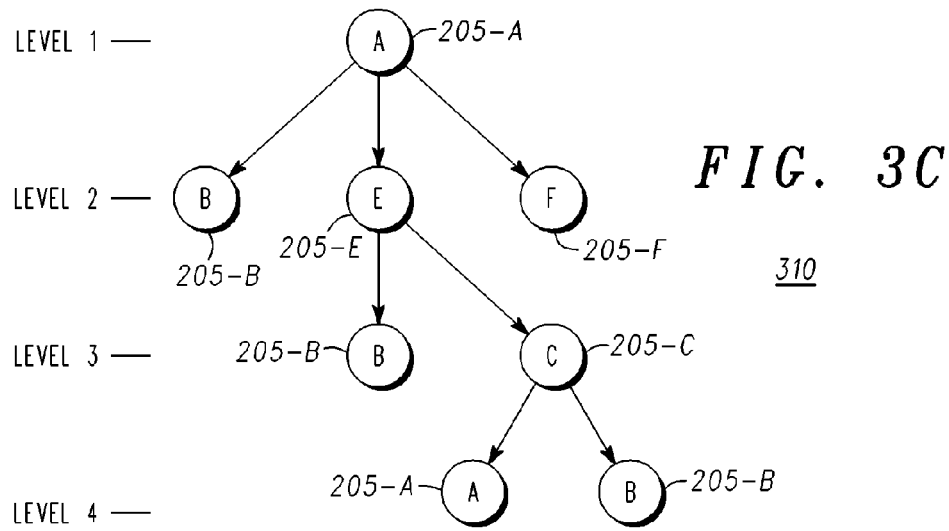
FIG. 3C is a drawing of a graph representation of the adjacency matrix of FIG. 3B.

FIG. 3C is a drawing of a graph representation 310 of the adjacency matrix 300 of FIG. 3B. In FIG. 3C, the graph representation 310 is tree structure 310 representing possible transmission paths between a time-shifted participant 205 and other participants 205 for the coupling diagram 200 of FIG. 3A. In the tree structure 310 of FIG. 3C, at level 1 participant A 205-A is the root node as the time-shifted participant 205-A. Between level 1 and level 2, participant A 205-A transmits information to participants B, E, and F 205-B,205-E,205-F. At level 2, (1) participant B 205-B is the terminal node for this branch from participant A 205-A at level 1 since participant B 205-B is the time-shift requesting participant 205, and (2) participant F 205-F is the terminal node for this branch from participant A 205-A at level 1 since participant F 205-F does not transmit information to any other participant 205. Between level 2 and level 3, participant E 205-E transmits to participants B and C 205-B,205-C. At level 3, participant B 205-B is the terminal node for this branch from participant E 205-E at level 2 since participant B 205-B is the time-shift requesting participant 205. Between level 3 and level 4, participant C 205-C transmits information to participants A and B 205-A, 205-B . At level 4, (1) participant A 205-A is the terminal node for this branch from participant C 205-C at level 3 since participant A 205-A is the time-shifted participant 205, and (2) participant B 205-B is the terminal node for this branch from participant C 205-C at level 3 since participant B 205-B is the time-shift requesting participant.

Only those nodes (participants) of the tree structure 310 that lie on branches that terminate on the time-shift requesting participant 205, which may be referred to herein as the requesting participant 205 and which in this example is participant B 205-B, need to be time-shifted, which in this case are participants C and E 205-C,205-E in addition to the time-shifted participant 205, which in this case is participant A 205-A and which is already assumed to be time-shifted.

Figure 4:
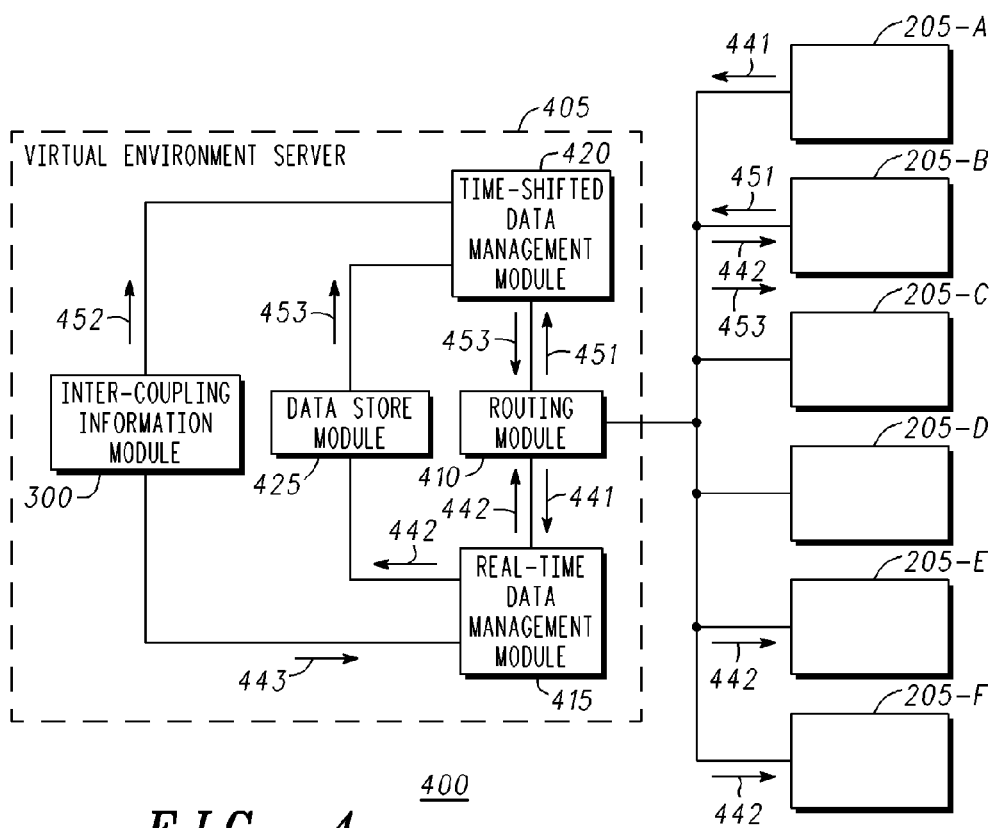
FIG. 4 is a drawing of a virtual environment system as described in various representative embodiments.

FIG. 4 is a drawing of a shared virtual environment system 400 as described in various representative embodiments. The shared virtual environment system 400 of FIG. 4 includes participants A, B, C, D, E, and F 205-A,205-B,205-C,205-D, 205-E,205-F of FIGS. 3A. Each of these participants 205-A, 205-B,205-C,205-D, 205-E,205-F are coupled to a virtual environment server 405. The virtual environment server 405 comprises a routing module 410, a real-time data management module 415, a time-shifted data management module 420, a time-stamped data store module 425, which may also be referred to herein as a data store module 425, and an inter-coupling information module 300. In some embodiments, the inter-coupling information module 300 could be implemented as the adjacency matrix 300 of FIG. 3B. The shared virtual environment system 400 could also include an application server which is not shown in any of the figures. The application server could perform such functions as adding and deleting participants, creating and changing the coupling paths, maintaining a consistent state of the shared environment, and other functions necessary for the operation of the shared virtual environment 100. The routing module 410 is coupled to participants A, B, C, D, E, and F 205-A,205-B, 205-C,205-D,205-E,205-F, to the real-time data management module 415, and to the time-shifted data management module 420. The real-time data management module 415 is coupled to the time-stamped data store module 425 and the inter-coupling information module 300. The time-shifted data management module 420 is coupled to the time-stamped data store module 425 and the inter-coupling information module 300.

As an example, the adjacency matrix 300 of FIG. 3B is assumed for the inter-coupling information module 300 of the shared virtual environment system 400 of FIG. 4. When operating in real-time mode, participant A 205-A can transmit participant real-time data 441 to the virtual environment server 405. Participant real-time data 441, which may also be referred to herein as output presentation data 441, is data which one of the participants, for example participant A 205-A, wishes to share with other participants 205 of the shared virtual environment system 400. This data could include live video images and live sound from the user, still images, video-audio files, other files such as that of a spreadsheet, and other appropriate data. The participant real-time data 441 is received by the routing module 410 and transferred to the real-time data management module 415. The real-time data management module 415 adds a time-stamp to the participant real-time data 441 and stores resultant participant time-stamped data 442, which may also be referred to herein as real-time presentation data 442, in the time-stamped data store module 425. The time-stamped data store module 425 could be a file, data structure kept in active memory of the virtual environment server 405, or other appropriate data structure. The real-time data management module 415 then retrieves interconnect data 443 from the inter-coupling information module 300 and determines from the interconnect data 443 to which participants the transmitting participant, which in the example of FIG. 4 is participant A 205-A, transmits, i.e., which participants transmitting participant 205-A can be "seen by". The real-time data management module 415 then transfers the participant time-stamped data 442 to the routing module 410 for distribution to those participants to which the transmitting participant A 205-A transmits which in the example of FIG. 3A and as shown in FIG. 4 are participant B 205-B, participant E 205-E, and participant F 205-F.

When operating in time-shift mode, one of the participants, which in the example of FIG. 4 is time-shift requesting participant B 205-B, can request by means of a time-shift request 451, which may also be referred to herein as request 451, that one of the other participants, which in the example of FIG. 4 is time-shifted participant A 205-A, be time-shifted in some manner. Such time-shifts can include pausing the display on the time-shift requesting participant B 205-B of participant time-stamped data 442 received via the virtual environment server 405 originating from the time-shifted participant A 205-A. These time-shift functions can also include rewinding, i.e., replaying in backward flowing time, at various rates, pausing, playing, i.e., replaying in forward flowing time at normal rate, and fast forwarding, i.e., replaying in forward flowing time at various accelerated rates. When performing one of the time-shift functions, the stored participant time-stamped data 442 for time-shifted participant A 205-A is obtained from the time-stamped data store module 425 as time-shifted data 453, which may also be referred to herein as time-shifted presentation data 453, by the time-shifted data management module 420. The time-shifted data management module 420 then transfers the time-shifted data 453 for the time-shifted participant A 205-A to the time-shift requesting participant B 205-B via the routing module 410 for display on the video display 105 of the time-shift requesting participant B 205-B. Also, included with the participant time-shifted data 453 for the time-shifted participant A 205-A is participant time-shifted data 453 for any other participants, as determined from influence data 452 in the inter-coupling information module 300, that are also time-shifted due to the time-shifting of the time-shifted participant A 205-A, which for the coupling diagram 200 of FIG. 3A and the present example are participants C and E 205-C,205-E which are referred to herein as influence participants C and E 205-C,205-E. The influence participants C and E 205-C,205-E are those participants that are influenced by the time-shifted participant A 205-A and that influence participant B 205-B. The rate and timing of the various time-shift functions is specifiable by the time-shift requesting participant B 205-B. The time-shift mode can be terminated when desired by the time-shift requesting participant B 205-B.

Figure 5:
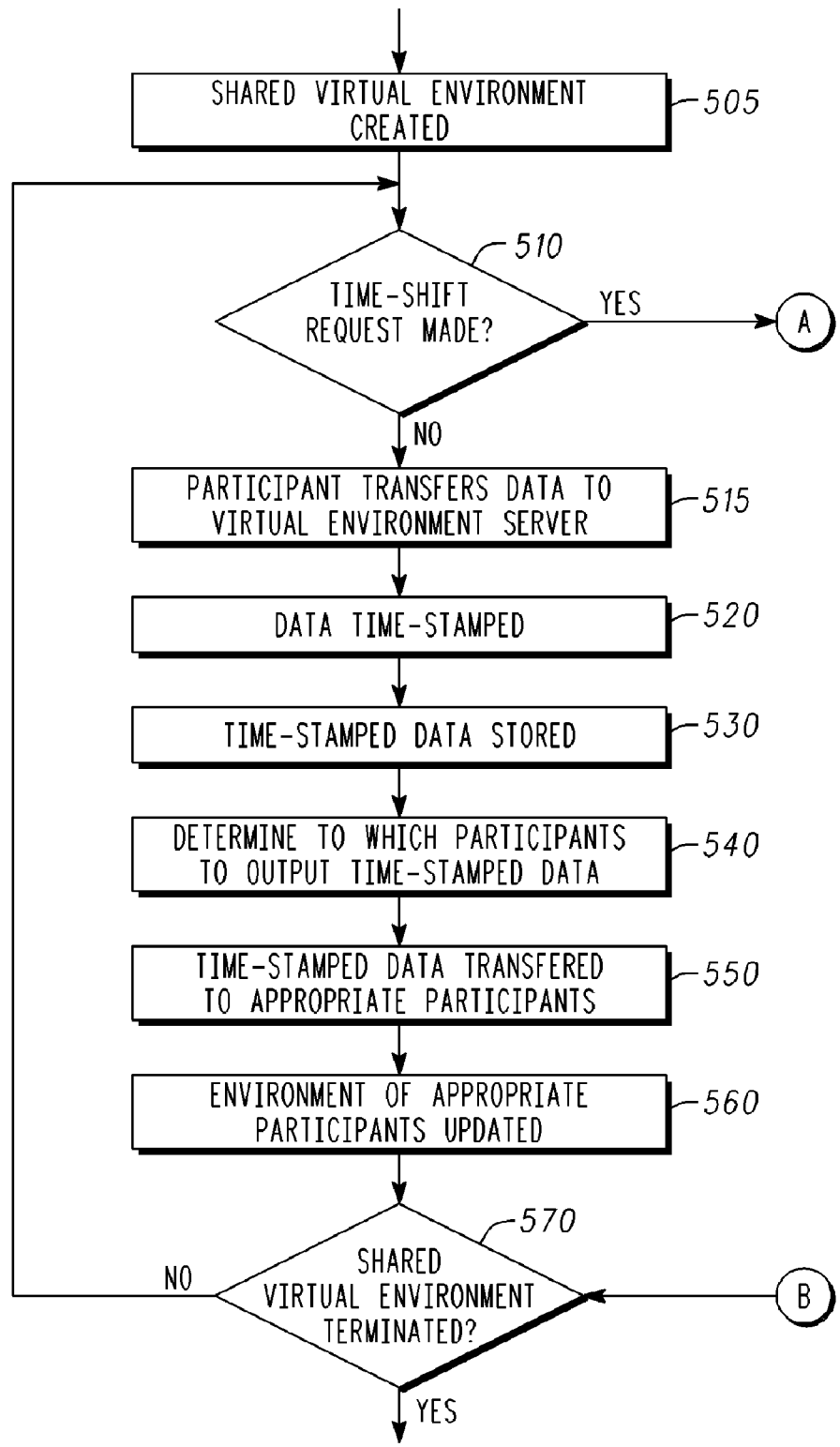
FIG. 5 is a flow chart of a first part of a method for managing multiple participants in a shared virtual environment with the output of participants displayed in real-time mode and time-shifted mode as appropriate as described in various representative embodiments.

FIG. 5 is a flow chart of a first part 500 of a method for managing multiple participants 205 in a shared virtual environment system 400 with the output of participants 205 displayed in real-time mode and time-shifted mode as appropriate as described in various representative embodiments. In block 505, the shared virtual environment 100 is created. When the shared virtual environment 100 is created, participants 205 would be added to the shared virtual environment 100, appropriate coupling paths would be created, and other operations as necessary to create and maintain the shared virtual environment 100 would be performed. Block 505 then transfers control to block 510.

Figure 6:
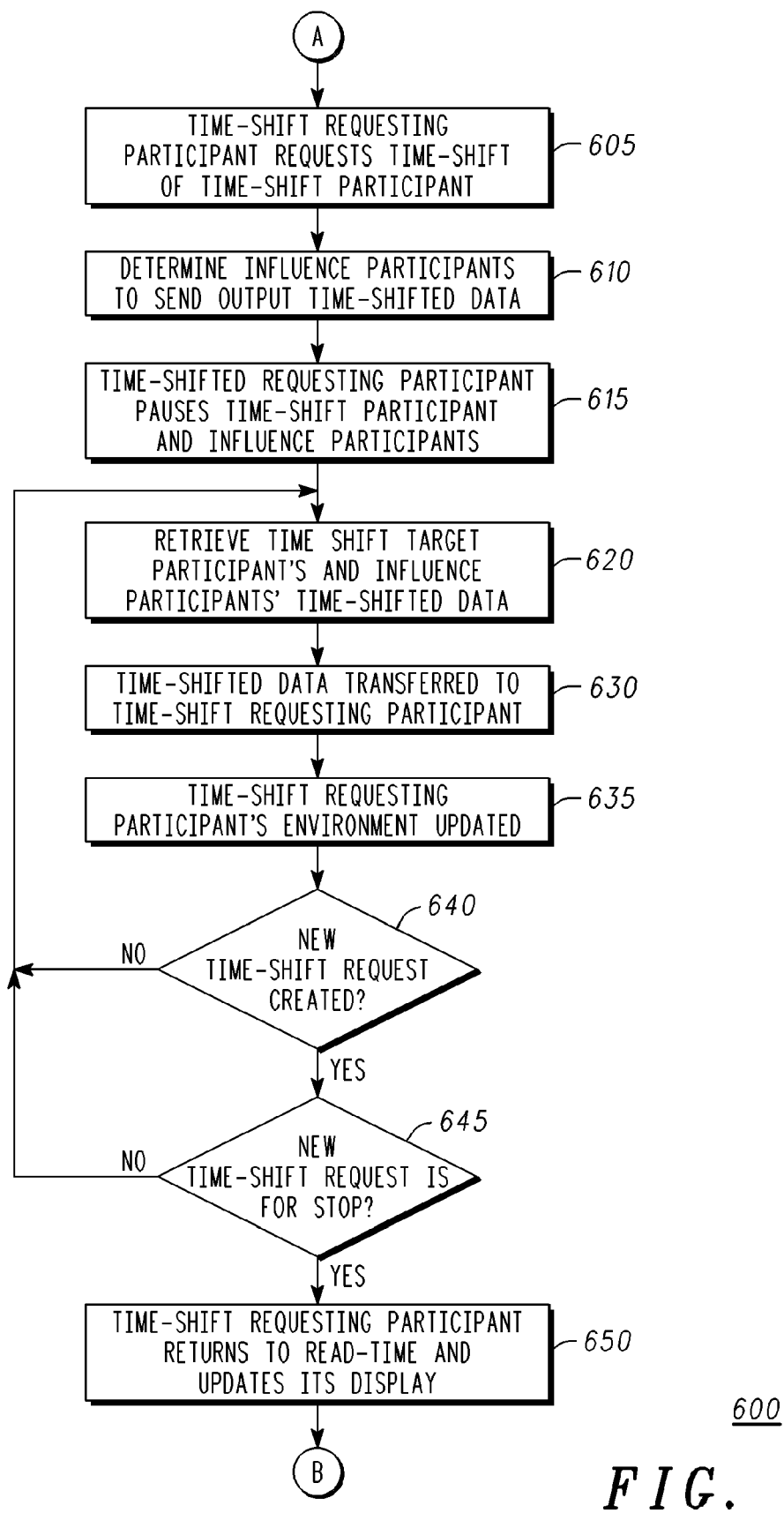
FIG. 6 is a flow chart of a second part of the method for managing multiple participants in a shared virtual environment with the output of participants displayed in real-time mode and time-shifted mode as appropriate as described in various representative embodiments.

In block 510, if a time-shift request 451 is made by one of the participants 205, block 510 transfers control to block 605 in FIG. 6. The transfer exit point in FIG. 5 is indicated by the letter "A" as is the transfer entry point in FIG. 6. Otherwise, block 510 transfers control to block 515.

In block 515, one of the participants 205 transfers data to the virtual environment server 405. Following the example above for the inter-coupling information module 300 which could be implemented as the adjacency matrix 300 of FIG. 3B for the shared virtual environment system 400 of FIG. 4, participant A 205-A transfers participant real-time data 441 to the virtual environment server 405. Participant real-time data 441 is data which participant A 205-A wishes to share with other participants 205 of the shared virtual environment system 400. This data could include live video images and live sound from the user, still images, video-audio files, other files such as that of a spreadsheet, and other appropriate data. Block 515 then transfers control to block 520.

In block 520, the participant real-time data 441 is time-stamped. In the shared virtual environment system 400 of FIG. 4, participant real-time data 441 is received by the routing module 410 of the virtual environment server 405 and transferred to the real-time data management module 415. The real-time data management module 415 adds the time-stamp to the participant real-time data 441. Block 520 then transfers control to block 530.

In block 530, the participant real-time data 441 is stored as participant time-stamped data 442 in the time-stamped data store module 425. The time-stamped data store module 425 could be a file or data structure kept in active memory of the virtual environment server 405. Block 530 then transfers control to block 540.

In block 540, it is determined to which participants 205 to output the participant time-stamped data 442. In the embodiment of FIG. 4, the real-time data management module 415 retrieves interconnect data 443 from the inter-coupling information module 300 and determines from the interconnect data 443 to which participants (participants B, E, and F 205-B,205-E,205-F in the example of FIG. 4) the transmitting participant (participant A 205-A in the example of FIG. 4) transmits. Block 540 then transfers control to block 550.

In block 550, the time-stamped data is transferred to the appropriate participants 205. In the embodiment of FIG. 4 with the example of FIG. 3A, the real-time data management module 415 then transfers the participant time-stamped data 442 to the routing module 410 for distribution to those participants to which the transmitting participant A 205-A transmits, i.e., participant B 205-B, participant E 205-E, and participant F 205-F. Block 550 then transfers control to block 560.

In block 560, the appropriate participants 205 update their environment data using participant time-stamped data 442. Again for the embodiment of FIG. 4 and the example of FIG. 3A, the appropriate participants 205 are those participants 205 to which the transmitting participant A 205-A transmits, i.e., participant B 205-B, participant E 205-E, and participant F 205-F. Block 560 then transfers control to block 570.

If the shared virtual environment 100 is terminated, block 570 terminates the process. Otherwise, block 570 transfers the process to block 510.

FIG. 6 is a flow chart of a second part 600 of the method for managing multiple participants 205 in a shared virtual environment system 400 with the output of participants 205 displayed in real-time mode and time-shifted mode as appropriate as described in various representative embodiments. In block 605, the time-shift requesting participant 205 requests time-shifted data 453 from the virtual environment server 405 of participant time-stamped data 442 originating from the time-shifted participant 205 which following the above example is participant A 205-A. The time-shift requests 451 can include rewinding, i.e., replaying in backward flowing time, at various rates, pausing, playing, i.e., replaying in forward flowing time at normal rate, and fast forwarding, i.e., replaying in forward flowing time at various accelerated rates. The rate and timing of the various time-shift functions is specifiable by the time-shift requesting participant 205 which for the present example is participant B 205-B. Block 605 then transfers control to block 610.

In block 610, those participants 205 that are influenced by the time-shifted target participant 205 and that in turn influence the time-shift requesting participant 205, which are also referred to herein as the influence participants 205, are determined. The influence participants 205 are determined using influence data 452 from the inter-coupling information module 300. For the present example, the influence participants 205 are participants C and E 205-C,205-E. The influence participants C and E 205-C, 205-E are those participants that are influenced by the time-shifted target participant 205-A and that influence the time-shift request participant B 205-B. Block 610 then transfers control to block 615.

In block 615, real-time updating of the time-shift requesting participant's 205 display 105 of input from the time-shifted participant 205 and influence participants 205 is paused. Block 615 then transfers control to block 620.

In block 620, the stored participant time-stamped data 442 for time-shifted participant 205 and for the influence participants 205 are obtained from the time-stamped data store module 425 as time-shifted data 453 by the time-shifted data management module 420. In the present example, the retrieved participant time-stamped data 442 is for time-shifted participant A 205-A and for influence participants C and E 205-C,205-E. Block 620 then transfers control to block 630.

In block 630, the time-shifted data 453 is transferred to the time-shift requesting participant 205. This transfer is effected on the virtual environment server 405 by transferring the time-shifted data 453 from the time-shifted data management module 420 to the routing module 410. The routing module 410 then transfers the time-shifted data 453 to the time-shift requesting participant 205 which for the present example is time-shift requesting participant B 205-B with the transferred data being participant time-stamped data 442 for the time-shifted participant A 205-A and for influence participants C and E 205-C,205-E. Block 630 then transfers control to block 635.

In block 635, the time-shift requesting participant's 205 (time-shift requesting participant B 205-B) environment is updated to incorporate the received time-shifted data. Block 635 then transfers control to block 640.

If a new time-shift request 451 is created by the time-shift requesting participant 205 (time-shift requesting participant B 205-B), block 640 transfers control to block 645. Otherwise, block 640 transfers control back to block 620.

If the new time-shift request 451 comprises terminating the effect of time-shifted data 453 of the time-shifted participant 205 (time-shifted participant A 205-A) on the time-shift requesting participant 205 (time-shift requesting participant B 205-B), block 645 transfers control to block 650. Otherwise, block 645 transfers control back to block 620.

In block 650, the effect of time-shifted data 453 of the time-shifted participant 205 (time-shifted participant A 205-A) on the time-shift requesting participant 205 (time-shift requesting participant B 205-B) is terminated, and the time-shift requesting participant 205 initiates responding to real-time participant time-stamped data 442 from the time-shifted participant 205 (participant A 205-A). Block 650 then transfers control to block 570 in FIG. 5. The transfer exit point in FIG. 6 is indicated by the letter "B" as is the transfer entry point in FIG. 5.

While the discussion of FIGS. 5 and 6 have been in terms of a single process flow, it will be recognized by one of ordinary skill in the art that multiple process flows similar to that of FIGS. 5 and 6 may be occurring concurrently. Such concurrently occurring process flows can represent both real-time and time-shifted process flows for different combinations of participants 205.

As is the case, in many data-processing products, the systems described above may be implemented as a combination of hardware and software components. Moreover, the functionality required for use of the representative embodiments may be embodied in computer-readable media (such as floppy disks, conventional hard disks, DVDs, CD-ROMs, Flash ROMs, nonvolatile ROM, and RAM) to be used in programming an information-processing apparatus to perform in accordance with the techniques so described.

The term "program storage medium" is broadly defined herein to include any kind of computer memory such as, but not limited to, floppy disks, conventional hard disks, DVDs, CD-ROMs, Flash ROMs, nonvolatile ROM, and RAM.

The shared virtual environment system 400 may be implemented as a network connected assemblage of computer servers, personal computers, laptop computers, personal digital assistants (PDAs), cell phones, and other appropriate devices.

These devices may be capable of running one or more of any commercially available operating system such as DOS, various versions of Microsoft Windows (Windows 95, 98, Me, 2000, NT, XP, or the like), Apple's MAC OS X, UNIX, Linux, or other operating system suitable for the particular device.

In a representative embodiment, a method 500, 600 for managing time-shifted presentation data 453 between multiple participants 205 in a shared virtual environment 100 is disclosed. The method comprises if real-time presentation data 442 is received by a given participant 205 from a second participant 205, updating a presentation environment 105 of the given participant 205 using the received real-time presentation data 442. And further comprises if the given participant 205 initiates a request 451 to obtain time-shifted presentation data 453 from one of the other participants 205: requesting time-shifted presentation data 453 for the time-shifted participant 205, determining any influence participants 205, pausing changes to the presentation environment 105 of the requesting participant 205 for real-time presentation data 442 from the time-shifted participant 205 and the influence participants 205, retrieving the requested time-shifted presentation data 453 for the time-shifted participant 205 and any influence participants 205, updating the presentation environment 105 of the requesting participant 205 using the retrieved time-shifted presentation data 453, repeating the above beginning with retrieving the requested time-shifted presentation data 453 until a new time-shift request 451 is initiated by the requesting participant 205, and if the new request 451 indicates a return to real-time operation: updating the presentation environment 105 of the requesting participant 205 to reflect real-time presentation data 442 of the time-shifted participant 205 and any influence participants 205, otherwise: repeating the above beginning with retrieving the requested time-shifted presentation data 453, otherwise: repeating the above. The influence participants 205 are those other participants 205 whose input presentation data 442 are influenced by the time-shifted participant 205 and whose output presentation data 441 influence the presentation environment 105 of the requesting participant 205.

In another representative embodiment, a virtual environment server 405 for managing time-shifted presentation data 453 between multiple participants 205 in a shared virtual environment system 400 is disclosed. The server comprises a routing module 410 configurable for coupling to multiple participants 205, a real-time data management module 415 coupled to the routing module 410, a time-shifted data management module 420 coupled to the routing module 410, and a data store module 425 coupled to the real-time data management module 415 and to the time-shifted data management module 420. The routing module 410 is configured to receive participant real-time data 441 from the participants 205 and to transfer that participant real-time data 441 to the real-time data management module 415; the real-time data management module 415 is configured to store the participant real-time data 441 as real-time presentation data 442, and transfer the real-time presentation data 442 to the routing module 410 for subsequent transfer to appropriate participants 205; the routing module 410 is further configured to receive request 451 from a requesting participant 205 to obtain time-shifted presentation data 453 from a time-shifted participant 205 and any influence participants 205 and to transfer that request 451 to the time-shifted data management module 420; the influence participants 205 are those other participants 205 whose input presentation data 442 are influenced by the time-shifted participant 205 and whose output presentation data 441 influence a presentation environment 105 of the requesting participant 205; and the time-shifted data management module 420 is configured to retrieve time-shifted presentation data 453 from the data store module 425 and to transfer that time-shifted presentation data 453 to the routing module 410 for subsequent transfer to the requesting participant 205.

In still another representative embodiment, a means for managing time-shifted presentation data 453 between multiple participants 205 in a shared virtual environment system 400 is disclosed. The means for managing time-shifted presentation data 453 comprises a means for routing 410 configurable for coupling to multiple participants 205, a means for managing real-time data 415 coupled to the means for routing 410, a means for managing time-shifted data 420 coupled to the means for routing 410, and a means for storing data 425 coupled to the means for managing real-time data 415 and to the means for managing time-shifted data 420. The means for routing 410 is configured to receive participant real-time data 441 from the participants 205 and to transfer that participant real-time data 441 to the means for managing real-time data 415; the means for managing real-time data 415 is configured to store the participant real-time data 441 as real-time presentation data 442, and transfer the real-time presentation data 442 to the means for routing 410 for subsequent transfer to appropriate participants 205; the means for routing 410 is further configured to receive request 451 from a requesting participant 205 to obtain time-shifted presentation data 453 from a time-shifted participant 205 and any influence participants 205 and to transfer that request 451 to the means for managing time-shifted data 420; the influence participants 205 are those other participants 205 whose input presentation data 442 are influenced by the time-shifted participant 205 and whose output presentation data 441 influence a presentation environment 105 of the requesting participant 205; and the means for managing time-shifted data 420 is configured to retrieve time-shifted presentation data 453 from the means for storing data 425 and to transfer that time-shifted presentation data 453 to the means for routing 410 for subsequent transfer to the requesting participant 205.

Techniques have been disclosed above for the management of time-shifted input streams from participants in a shared, multiple participant, virtual environment. Participants are able to observe and interact with other participants in the environment in real-time. Also, however, the participants can selectively pause, rewind, stop, replay, and fast-forward input from one or more of the other participants while maintaining active coupling with other participants who are not influenced by the time-shifted participants.

Using techniques disclosed herein a participant can review previous input from another participant. If, for example, a participant is late joining a meeting held in the shared virtual environment, that participant can catch-up with the presentations made in the meeting by doing a selective, quick review of earlier input from one or more of the other participants. Any input stream available to the participant can be reviewed at any time the participant deems important while that participant maintains real-time active interactions with the other non-time-shifted participants.

The representative embodiments, which have been described in detail herein, have been presented by way of example and not by way of limitation. It will be understood by those skilled in the art that various changes may be made in the form and details of the described embodiments resulting in equivalent embodiments that remain within the scope of the appended claims.

What is claimed is:

1. A method for managing time-shifted presentation data between multiple participants in a shared virtual environment, comprising:
   if real-time presentation data is received by a given participant from a second participant, updating a presentation environment of the given participant using the received real-time presentation data;
   if the given participant initiates a request to obtain time-shifted presentation data from one of the other participants:
      requesting time-shifted presentation data for the time-shifted participant;
      determining any influence participants, wherein the influence participants are those other participants whose input presentation data are influenced by the time-shifted participant and whose output presentation data influence the presentation environment of the requesting participant;
      pausing changes to the presentation environment of the requesting participant for real-time presentation data from the time-shifted participant and the influence participants;
      retrieving the requested time-shifted presentation data for the time-shifted participant and any influence participants;
      updating the presentation environment of the requesting participant using the retrieved time-shifted presentation data;
      repeating the above beginning with retrieving the requested time-shifted presentation data until new time-shift request is initiated by the requesting participant; and
      if the new request indicates a return to real-time operation:
         updating the presentation environment of the requesting participant to reflect real-time presentation data of the time-shifted participant and any influence participants,
      otherwise:
         repeating the above beginning with retrieving the requested time-shifted presentation data;
   otherwise:
      repeating the above.

2. The method as recited in claim 1, wherein following retrieving the requested time-shifted presentation data, transferring the retrieved time-shifted presentation data to the requesting participant.

3. The method as recited in claim 1, further comprising:
   prior to updating the presentation environment of the given participant with real-time presentation data, transferring that real-time presentation data to a virtual environment server.

4. The method as recited in claim 1, further comprising:
   prior to updating the presentation environment of the given participant, creating the shared virtual environment for at least one of the participants, wherein the shared virtual environment comprises presentation data from at least one of the other participants.

5. The method as recited in claim 1, wherein determining any influence participants employs an adjacency matrix, wherein the adjacency matrix comprises a list of the participants in the top row and in the left-most column, wherein a row identifies from which of the other participants that row participant receives information, and wherein a column identifies to which of the other participants that column participant transmits information.

6. The method as recited in claim 1, wherein requests for time-shifted presentation data comprise transmitting in reverse time the time-shifted presentation data at a selected rate, pausing the time-shifted presentation data and transmitting the time-shifted presentation data in forward time at another selected rate.

7. The method as recited in claim 1, further comprising:
   prior to updating the presentation environment of the given participant using received real-time presentation data, adding a time-stamp to the real-time presentation data.

8. The method as recited in claim 7, further comprising:
   storing the real-time presentation data with the added time-stamp.

9. The method as recited in claim 8, further comprising
   determining participants to receive input presentation data from the second participant.

10. A virtual environment server stored in a computer readable storage medium for managing time-shifted presentation data between multiple participants in a shared virtual environment system, comprising:
    a routing module configurable for coupling to multiple participants;
    a real-time data management module coupled to the routing module;
    a time-shifted data management module coupled to the routing module; and
    a data store module coupled to the real-time data management module and to the time-shifted data management module, wherein the routing module is configured to receive output presentation data from the participants and to transfer that output presentation data to the real-time data management module, wherein the real-time data management module is configured to store the output presentation data as real-time presentation data, and transfer the real-time presentation data to the routing module for subsequent transfer to appropriate participants, wherein the routing module is farther configured to receive a request from a requesting participant to obtain time-shifted presentation data from a time-shifted participant and any influence participants and to transfer that request to the time-shifted data management module, wherein the influence participants are those other participants whose input presentation data are influenced by the time-shifted participant and whose output presentation data influence a presentation environment of the requesting participant, wherein the time-shifted data management module is configured to retrieve time-shifted presentation data from the data store module, to transfer that time-shifted presentation data to the routing module for subsequent transfer to the requesting participant, to update the presentation environment of the requesting participant using the retrieved time-shifted presentation data, to repeat the above beginning with retrieving the requested time-shifted presentation data until new time-shift request is initiated by the requesting participant; and wherein the time-shifted data management module is configured to update the presentation environment of the requesting participant to reflect real-time presentation data of the time-shifted participant and any influence participants if the new request indicates a return to real-time operation.

11. The virtual environment server as recited in claim 10, further comprising:
    an inter-coupling information module coupled to the real-time data management module and to the time-shifted data management module, wherein the inter-coupling information module comprises information specifying the coupling of the participants in a shared virtual environment.

12. The virtual environment server as recited in claim 11, wherein the inter-coupling information module comprises an adjacency matrix, wherein the adjacency matrix comprises a list of the participants in the top row and in the left-most column, wherein a row identifies from which of the other participants that row participant receives information and wherein a column identifies to which of the other participants that column participant transmits information.

13. The virtual environment server as recited in claim 10, wherein the real-time data management module is configured to add a time-stamp to the participant output presentation data.

14. The virtual environment server as recited in claim 13, wherein the real-time data management module is configured to store the time-stamped participant output presentation data as real-time presentation data in the data store module.

15. The virtual environment server as recited in claim 10, wherein the real-time data management module is configured to determine those participants to receive input presentation data from another participant.

16. The virtual environment server as recited in claim 10, wherein the virtual environment server is configured to create a shared virtual environment for at least one of the participants, wherein the shared virtual environment comprises input presentation data from at least one of the other participants.

17. The virtual environment server as recited in claim 10, wherein requests for time-shifted presentation data comprise transmitting in reverse time the time-shifted presentation data at a selected rate, pausing the time-shifted presentation data, and transmitting the time-shifted presentation data in forward time at another selected rate.

18. Means for managing time-shifted presentation data between multiple participants in a shared virtual environment system, comprising:

means for routing configurable for coupling to multiple participants;

means for managing real-time data coupled to the means for routing;

means for managing time-shifted data coupled to the means for routing; and means for storing data coupled to the means for managing real-time data and to the means for managing time-shifted data, wherein the means for routing is configured to receive output presentation data from the participants and to transfer that output presentation data to the means for managing real-time data, wherein the means for managing real-time data is configured to store the participant output presentation data as real-time presentation data, and transfer the real-time presentation data to the means for routing for subsequent transfer to appropriate participants, wherein the means for routing is further configured to receive request from a requesting participant to obtain time-shifted presentation data from a time-shifted participant and any influence participants and to transfer that request to the means for managing time-shifted data, wherein the influence participants are those other participants whose input presentation data are influenced by the time-shifted participant and whose output presentation data influence a presentation environment of the requesting participant, wherein the means for managing time-shifted data is configured to retrieve time-shifted presentation data from the means for storing data and to transfer that time-shifted presentation data to the means for routing for subsequent transfer to the requesting participant;

means for updating the presentation environment of the requesting participant using the retrieved time-shifted presentation data, wherein means for repeating the above beginning with retrieving the requested time-shifted presentation data until new time-shift request is initiated by the requesting participant; and wherein means for updating the presentation environment of the requesting participant to reflect real-time presentation data of the time-shifted participant and any influence participants if the new request indicates a return to real-time operation.

* * * * *